United States Patent [19]

Kohn

[11] Patent Number: 4,880,699
[45] Date of Patent: Nov. 14, 1989

[54] ULTRATHIN POLYIMIDE POLYMER FILMS AND THEIR PREPARATION

[75] Inventor: Rachel S. Kohn, Springfield, N.J.

[73] Assignee: Hoechst Celanese Corporation, Somerville, N.J.

[21] Appl. No.: 339,903

[22] Filed: Apr. 17, 1989

Related U.S. Application Data

[60] Continuation of Ser. No. 267,712, Nov. 4, 1988, abandoned, which is a continuation of Ser. No. 149,829, Jan. 29, 1988, abandoned, which is a division of Ser. No. 917,731, Oct. 10, 1988, Pat. No. 4,746,474.

[51] Int. Cl.$^4$ .............................................. B29C 41/12
[52] U.S. Cl. .................................... 428/333; 428/334; 428/473.5; 528/188; 528/229; 528/353
[58] Field of Search ............... 428/333, 334, 473.5; 528/188, 229, 353

[56] References Cited

U.S. PATENT DOCUMENTS

| | | | |
|---|---|---|---|
| 2,710,853 | 6/1955 | Edwards | 528/289 |
| 3,673,145 | 6/1972 | Minami et al. | 528/182 |
| 3,767,737 | 10/1973 | Lundstrom | 264/216 |
| 3,892,665 | 7/1975 | Steigelmann et al. | 264/41 |
| 4,155,793 | 5/1979 | Selemme et al. | 264/298 |
| 4,279,855 | 7/1981 | Ward | 264/216 |
| 4,374,891 | 2/1983 | Ward | 428/447 |
| 4,393,113 | 7/1983 | Sugie et al. | 428/447 |
| 4,746,474 | 5/1988 | Kohn | 524/465 |

*Primary Examiner*—Morton Foelak
*Attorney, Agent, or Firm*—Lynch, Cox, Gilman & Mahan

[57] ABSTRACT

Disclosed herein are free-standing, pinhole-free, ultrathin polyimide films having thicknesses of about 400 angstroms or less and a process to prepare them. The films find particular utility in separatory applications.

13 Claims, No Drawings

4,880,699

ULTRATHIN POLYIMIDE POLYMER FILMS AND THEIR PREPARATION

STATEMENT AS TO RIGHTS TO INVENTIONS MADE UNDER FEDERALLY SPONSORED RESEARCH AND DEVELOPMENT

This invention was made with Government support under Contract No. DAAK 20-84-C-0147 awarded by the Department of Defense (DOD). The Government has certain rights in this invention.

CROSS REFERENCE TO RELATED APPLICATIONS

This is a continuation of application Ser. No. 07/267,712 filed on Nov. 4, 1988, now abandoned, which is a continuation of Ser. No. 07/149,829 filed on Jan. 29, 1988, now abandoned, which is a divisional of application Ser. No. 06/917,731 filed on Oct. 10, 1988 and issued as U.S. Pat. No. 4,746,474 on May 24, 1988.

BACKGROUND OF INVENTION

1. Field of Invention

This invention relates to polymer films. More particularly, this invention relates to ultrathin, polyimide polymer films and their production.

2. Prior Art

In U.S. Pat. No. 3,673,145, a process for preparing polyimide solutions that can be cast as films is disclosed. However, the disclosed films have thicknesses between 15 microns (i.e. 150,000 angstroms) and 80 microns (i.e. 800,000 angstroms) and cannot, therefore, be classified as ultrathin polyimide films.

In U.S. Pat. No. 2,867,609 void-free films allegedly prepared from polypyromellitimides are disclosed. However, no film thicknesses are disclosed.

In U.S. Pat. No. 2,710,853, polypyromellitimide films having thicknesses of three to seven mils are disclosed. However, the films are not ultrathin.

In U.S. Pat. No. 3,179,614, polyamide-acid films having thicknesses of 0.1 to 1.0 mils are converted to polyimide films by either heating the films or by treating them with acetic anhydride and pyridine. Such films, however, are not ultrathin.

Similarly, in U.S. Pat. Nos. 3,179,633 and 3,179,634, polyamide-acid films having thicknesses between 0.1 and 7 mils are thermally or chemically converted to polyimide films.

In U.S. Pat. No. 2,760,233, a process is disclosed for preparing curved polymer sheets from polyamide polymers. However, polyimide films are not disclosed nor are specific solvent mixtures and ratios suitable for casting ultrathin, pinhole-free, polyimide films disclosed.

U.S. Pat. No. 3,551,244 discloses a process for preparing on a water surface films having thicknesses between 0.05 and 5.0 microns (i.e. between 500 and 50,000 angstroms). The patent discloses that certain halogenated solvents, such as chlorobenzene, are suitable casting solvents and states that polyamide films can be prepared. However, polyimide polymers are not disclosed as being suitable and no specific solvent mixtures and ratios suitable for casting pinhole-free polyimide films having thicknesses less than 400 angstroms are disclosed.

In U.S. Pat. No. 3,933,561, a process for preparing polymeric films on water is disclosed. The film thicknesses are usually less than about 2.5 microns (i.e. 25,000 angstroms) and thicknesses of less than 0.1 micron (i.e. 1000 angstroms) are allegedly achieved. While polyamides are allegedly suitable for the patent's process, polyimide films are not disclosed nor are specific solvent mixtures and ratios suitable for casting ultrathin polyimide films.

U.S. Pat. No. 3,767,737 discloses a method for producing nonporous polymer membranes having thicknesses between 0.005 and 0.05 mils on a support liquid. Any polymer capable of being cast as a film from solvents is asserted to be suitable for use in the patent's process. However, polyimides are not specifically listed as suitable polymers and specific mixtures of solvents and appropriate solvent ratios for preparing pinhole-free polyimide films having thicknesses of 400 angstroms or less are not disclosed.

U.S. Pat. Nos. 4,155,793, 4,279,855 and 4,374,891 disclose processes for preparing substantially void-free, ultrathin, permeable, polymeric membranes having a thickness of 500 angstroms or less. Organic and inorganic polymers are allegedly suitable for use in the patent's process. However, only films prepared from organopolysiloxane-polycarbonate interpolymers mixed with polyphenylene oxide are disclosed in the examples. Polyimide films are not disclosed nor are suitable solvent mixtures and ratios for casting polyimide films having thicknesses of 400 angstroms or less.

Other patents, such as U.S. Pat. Nos. 2,631,334, 2,689,187, and 4,393,113, also disclose ultrathin, polymeric films. However, polyimide films are not disclosed.

In the prior art, the preparation of ultrathin, pinhole-free, polyimide, free-standing films having thicknesses of less than 400 angstroms generally has not been disclosed. Usually, prior art polymer films having thicknesses of less than 400 angstroms contain voids and other macroscopic defects.

Therefore, it is an object of this invention to prepare ultrathin, polyimide polymer films.

It is a further object of this invention to prepare pinhole-free, polyimide polymeric films.

It is also an object of this invention to prepare free-standing, polyimide films having thicknesses of 400 angstroms or less.

These and other objects are obtained by the products and process of the present invention.

SUMMARY OF INVENTION

The instant invention provides a process for preparing macroscopically pinhole-free, ultrathin, free-standing polyimide films having thicknesses of about 400 angstroms or less. The films are prepared by dissolving a polyimide polymer in a suitable mixture of 1,2,3-trichloropropane and ortho-dichlorobenzene to form a polymeric solution, casting the solution on water to form a free-standing film, and removing the film from the water. The ultrathin films of the present invention can be used in separatory applications and as drug release membranes for the controlled release of drugs.

DETAILED DESCRIPTION OF INVENTION

The preparation of polyimides is well known in the prior art. Polyimides are generally prepared in a two-step process in which a dianhydride and a diamine are first reacted to prepare a polyamic acid which is subsequently converted to a polyimide in a second step.

A wide variety of dianhydrides and diamines can be reacted to prepare polyimides that are suitable for use in the present invention. Dihydrides and diamines that can be reacted to yield suitable polyimides as well as processes for preparing such polyimides are disclosed in "Polyimides," by C. E. Sroog, *J. Polymer Science:* Macromolecular Reviews, volume 11, 161–208 (1976), and U.S. Pat. Nos. 2,710,853, 3,179,631 and 3,179,634 which are incorporated herein by reference. The preferred dianhydrides are 3,3',4,4'-benzophenone tetracarboxylic dianhydride and pyromellitic dianhydride. The preferred diamines are bis-(4-aminophenyl) ether and 5(6)-amino-1-(4'-aminophenyl)-1,3,3-tri-methylindane (DAPI).

A variety of solvents can be used for the reaction of the dianhydride with the diamine. Suitable solvents are disclosed in U.S. Pat. No. 3,179,634. Preferably, the solvent is dimethyl formamide, dimethyl sulfoxide or dimethylacetamide, and most preferably is dimethylacetamide.

After a polyamic acid is prepared by the reaction of a diamine and a dianhydride, the polyamic acid is converted to a polyimide using thermal or chemical conversion processes. Preferably, the polymeric acid is chemically converted employing acetic anhydride in the presence of pyridine. The resulting polyimide can be precipitated by water and then filtered and dried.

The preferred polyimides have repeating units of the formula:

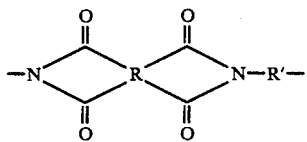

wherein R is a tetravalent organic radical selected from the group consisting of aromatic, aliphatic, cycloaliphatic, heterocyclic, combinations of aromatic and aliphatic, and substituted groups thereof and preferably R is a tetravalent aromatic radical containing at least one ring of six carbon atoms, said ring being characterized by benzenoid unsaturation and the four carbonyl groups being attached directly to separate carbon atoms in a ring of the R radical and each pair of carbonyl groups being attached to adjacent carbon atoms in a ring of the R radical, and wherein R' is a divalent benzenoid radical selected from the group consisting of:

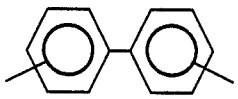 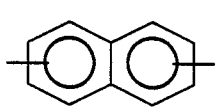

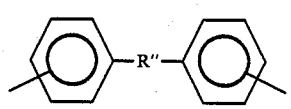

-continued
and

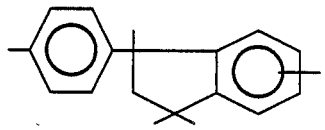

wherein R" is selected from the group consisting of an alkylene chain having one to three carbon atoms,

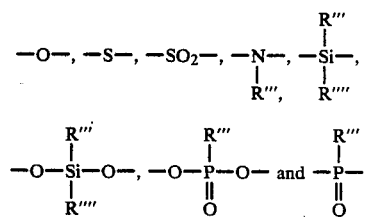

wherein R''' and R'''' are selected from the group consisting of alkyl and aryl.

In the most preferred polyimide polymer, R is

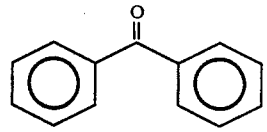

and
R' is

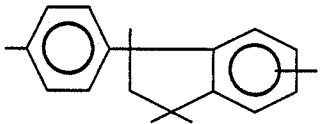

and it can be represented by the general formula:

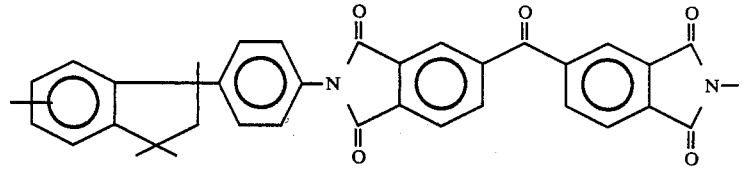

It is prepared by the reaction of DAPI with 3,3',4,4',-benzophenone tetracarboxylic dianhydride to produce a polyamic acid. The polyamic acid can be chemically imidized using acetic anhydride and pyridine according to the teachings of U.S. Pat. No. 3,179,634. The preferred polyimide polymer is sold under the tradename Araldite XU 218 and is available from the Ciba-Geigy Corporation.

The preferred polyimide polymers have molecular weights, $M_w$, greater than about 25,000.

Although 1,2,3-trichloropropane alone can be employed to cast ultrathin polyimide films, it is preferred to employ a mixture of 1,2,3-trichloropropane and ortho-dichlorobenzene. The presence of ortho-dichlorobenzene in the solution used for casting the film tends to make the film more uniform in thickness. Suitable solvent ratios are about a 1:1 to about a 10:1 by volume ratio of 1,2,3-trichloropropane:ortho-dichlorobenzene and preferably about a 20:7 ratio. The solvent ratios described above should not be altered substantially because if too much ortho-dichlorobenzene is employed, the film may be too thin and fragile to lift from the casting surface.

After a suitable solvent mixture is prepared, the polyimide polymer is dissolved in the solvent mixture to prepare a casting solution by stirring the polymers and solvents at a temperature less than 100° C. (eg. 60° C.) for several hours (eg. three to seven hours). The casting solution will contain about two to about twelve percent by weight of the polymer, preferably about four to about eight percent and most preferably about seven to about eight percent based upon the total weight of the casting solution. Generally, the greater the amount of polymer in the casting solution, the thicker the films will be that are prepared. Conversely, the lower the amount of polymer, the thinner the films will be. However, if the percent by weight is too low, such as below one percent by weight, the film will be too fragile to lift from the casting surface and will contain defects, such as holes. The polymer solution can be employed immediately after preparation or stored in appropriate containers, such as teflon bottles, at room temperature.

The polyimide films may be cast from a mixed polymer solution containing a polyimide polymer and a minor amount of other polymers which are compatible in film form with the polyimide polymer and which can be dissolved in the casting solution. When other polymers are added, the amount of polyimide employed should be 80 percent or more by weight based upon the total weight of polymers dissolved in the polymeric solution.

Before the polymeric solution is cast into films, it is preferred to filter the solution using membranes. Filtration of the polymer solution before casting substantially reduces imperfections in the cast films. The solution can be passed through a Millipore microfiltration membrane having pores with a diameter of about 0.45 micron and available from the Millipore Corporation. In order to pass the solution through the membrane, it is usually necessary to apply pressure. For example, a Millipore stainless 47 mm pressure holder operated at a pressure up to 100 psi argon can be used. The amount of pressure applied will depend upon the viscosity of the solution and the pore size of the membrane.

After filtration, the solution is cast on water at or near room temperature. As used herein, the term "water" includes aqueous solutions containing minor amounts (eg. one percent or less by weight based upon the total weight of the solution) of organic solvents (eg. lower weight alcohols) the presence of which does not adversely affect the properties of the film cast on the solution. The addition of such organic solvents may facilitate the removal of the film from the water's surface. The water is contained in any suitable walled container. For example, an appropriate container is an aluminum container having the dimensions 12"×12"×3". Preferably, the walls of the container are sloped outwardly at about a 20 degree incline to reduce reflected surface waves which can damage the film. Such waves are produced when the polymeric solution is placed on the water's surface or by air currents and external vibrations. Most preferably, the inside walls of the container are teflon coated so that films are less likely to stick to the sides of the container.

The polymeric solution is cast by depositing a drop of the polymer solution upon the water's surface. The solution usually spreads over the surface of the water in three seconds or less. The solution is allowed to stand until a sufficient amount of the solvent has evaporated to form a free-standing film. As used herein the term "free-standing film" refers to a film which has a physically stable shape and is dimensionally stable on its casting surface and can be removed from the casting surface without having to be supported over the entire surface area of the film. The time of evaporation generally is between 20 and 30 seconds and rarely more than about 60 seconds.

After the solvent has evaporated, the film is lifted from the liquid surface using any suitable means, such as a 2"×3", thin, aluminum plate having a 30 millimeter inner diameter hole in it and a handle on one end of the plate. When the aluminum plate touches the surface of the film, the film adheres to the aluminum plate and may be readily removed from the surface of the water.

The films of the instant invention can be crosslinked to produce more durable and chemical resistant films by heating at temperatures in the range of about 250° C. to about 350° C., preferably about 290° C., for several hours.

In crosslinking the films prepared herein, it is preferred to heat and cool the films very gradually in order to avoid film breakage. For example, the films can be heated from room temperature to the desired crosslinking temperature at a rate of 2° C. per minute, held at the desired temperature for about two hours, and then gradually allowed to cool to room temperature. Any oven that permits such increments in temperature can be employed.

The films of the instant invention are generally round, ultrathin, pinhole-free, uniform films having a diameter of about four to about six inches and a thickness of about 400 angstroms or less, preferably less than about 300 angstroms and most preferably about 150 to about 300 angstroms. As used herein, the term "ultrathin film" refers to a film having a thickness of 400 angstroms or less, and the term "pinhole-free film" refers to a film having no macroscopic holes.

The films of this invention can be used as gas separation membranes and in end uses where a controlled release of drugs is needed.

The invention is illustrated by the following examples in which all percentages are by weight unless otherwise specified.

EXAMPLE 1

A polymer solution containing 7.4 percent by weight polyimide in a mixture of 20:7 by volume 1,2,3-trichloropropane:ortho-dichlorobenzene was prepared by dissolving the polymer in the solvent mixture. The polyimide was Araldite XU 218, had a density of 1.20 g/cm$^3$, was obtained from the Ciba-Geigy Corporation, Inc., and had repeating units of the formula:

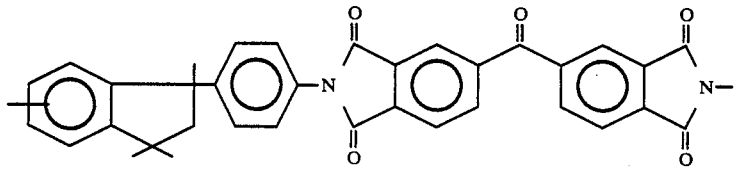

The solution was prepared by magnetically stirring the solvents and the polymer at 60° C. for about five hours.

After the polymer was dissolved in the solvent it was passed through a Durapore polyvinylidene fluoride membrane having pores with a diameter of 0.45 micron obtained from the Millipore Corporation. A Millipore stainless 47 millimeter pressure holder operated at a pressure sufficient to force the solution through the membrane was employed.

After filtration, a drop of the polymer solution was deposited on water contained in a square aluminum container measuring 12"×12"×3" and having teflon coated walls which were sloped away from the center at a 20 degree incline. The drop spread rapidly over the surface of the water to form a film having a diameter of about five inches. After 20 seconds, the film was lifted from the surface of the water using a 2" by 3" aluminum plate with a 30 mm diameter hole in the middle and a handle at one end. The film was uniform, had a thickness of about 230 angstroms and contained no macroscopic voids.

The film was crosslinked by placing the film in a Fisher Isotemp Programmable Ashing Furnace, Model 495 at room temperature and then increasing the temperature at a rate of 2° C. per minute to 290° C. The oven was held at 290° C. for two hours and then the temperature was reduced gradually back to room temperature to cool the film. The resulting film was not soluble in 1,2,3-trichloropropane.

EXAMPLE 2

Example 1 was repeated except that the film was not crosslinked. When a drop of trichloropropane was placed on the film, the film dissolved instantly.

EXAMPLE 3

Example 1 was repeated except that a ten percent by weight solution of the polyimide 1,2,3-trichloropropane was prepared and the film was not cross-linked. The resulting film contained no macroscopic holes and had a thickness of about 350 angstroms.

EXAMPLE 4

Example 1 was repeated except that an eight percent by weight solution of the polyimide polymer in a 4:1 by volume mixture of 1,2,3-trichloropropane:ortho-dichlorobenzene was prepared. The resulting film had a thickness of about 250 angstroms and contained no macroscopic holes.

As can be seen, it is apparent that crosslinking the films can make them chemically more resistant and that 1,2,3-trichloropropane alone or mixtures of 1,2,3-trichloropropane and ortho-dichlorobenzene may be employed to cast ultrathin, pinhole-free films.

What is claimed is:

1. A pinhole-free, polyimide polymer film having a thickness of about 400 angstroms or less.

2. The film of claim 1 wherein the polyimide polymer has repeating units of the formula:

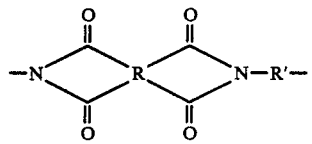

wherein R is a tetravalent organic radical selected from the group consisting of aromatic, aliphatic, cycloaliphatic, heterocyclic, combinations of aromatic and aliphatic, and substituted groups thereof and wherein R' is a divalent benzenoid radical selected from the group consisting of:

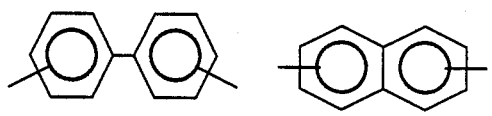

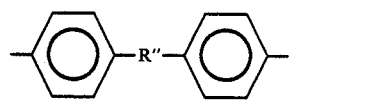

and

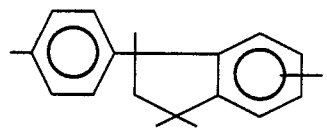

wherein R" is selected from the group consisting of an alkylene chain having one to three carbon atoms,

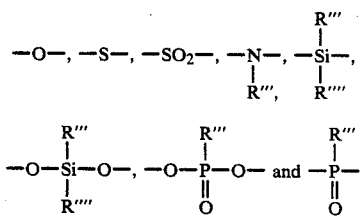

wherein R''' and R'''' are selected from the group consisting of alkyl and aryl.

3. The film of claim 2 wherein R is a tetravalent aromatic radical containing at least one ring of six carbon atoms, said ring being characterized by benzenoid unsaturation and the four carbonyl groups being attached directly to separate carbon atoms in a ring of the R radical and each pair of carbonyl groups being attached to adjacent carbon atoms in a ring of the R radical.

4. The film of claim 3 wherein R is

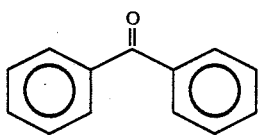

and R' is

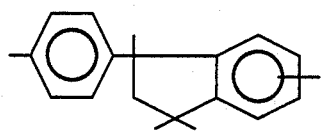

5. The film of claims 1, 2, 3 or 4 wherein the film is prepared from polyimide polymers having molecular weights, $M_w$, greater than about 25,000.

6. The film of claims 1, 2, 3 or 4 wherein the film has a thickness of about 300 angstroms or less.

7. The film of claim 6 wherein the film has a thickness in the range of about 150 to about 300 angstroms.

8. The film of claims 1, 2, 3 or 4 wherein the film is crosslinked by heating the film.

9. The film of claim 8 wherein the film is heated in the range of about 250° C. to about 350° C. to crosslink the film.

10. The film of claim 9 wherein the film is heated at a temperature of about 290° C. to crosslink the film.

11. The film of claim 7 wherein the film is crosslinked by heating the film.

12. The film of claim 7 wherein the film is heated in the range of about 250° C. to about 350° C. to crosslink the film.

13. The film of claim 7 wherein the film is heated at a temperature of about 290° C. to crosslink the film.

* * * * *